(12) United States Patent
Farmer et al.

(10) Patent No.: US 6,725,369 B1
(45) Date of Patent: Apr. 20, 2004

(54) CIRCUIT FOR ALLOWING DATA RETURN IN DUAL-DATA FORMATS

(75) Inventors: James C. Farmer, Sunnyvale, CA (US); Kent A. Dickey, Westford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/560,192

(22) Filed: Apr. 28, 2000

(51) Int. Cl.$^7$ ................................ G06F 7/00
(52) U.S. Cl. .................. 713/100; 710/65; 712/300
(58) Field of Search ............... 710/65; 712/1, 712/300; 713/1, 100

(56) References Cited

U.S. PATENT DOCUMENTS

| | | | |
|---|---|---|---|
| 4,580,240 A | * 4/1986 | Watanabe | 711/118 |
| 5,550,987 A | * 8/1996 | Tanaka | 710/106 |
| 5,640,545 A | 6/1997 | Baden et al. | 395/515 |
| 5,687,337 A | 11/1997 | Carnevale et al. | 395/380 |
| 5,781,763 A | 7/1998 | Beukema et al. | 395/500 |
| 5,828,853 A | 10/1998 | Regal | 395/308 |
| 5,828,884 A | 10/1998 | Lee et al. | 395/705 |
| 5,848,436 A | 12/1998 | Sartorius et al. | 714/154 |
| 5,867,690 A | 2/1999 | Lee et al. | 395/500 |
| 5,898,896 A | 4/1999 | Kaiser et al. | 395/885 |
| 5,907,865 A | * 5/1999 | Moyer | 711/201 |
| 5,928,349 A | * 7/1999 | Loen et al. | 712/1 |
| 5,968,164 A | 10/1999 | Loen et al. | 712/204 |
| 5,970,236 A | * 10/1999 | Galloway et al. | 712/300 |
| 6,085,203 A | * 7/2000 | Ahlers et al. | 715/523 |
| 6,243,808 B1 | * 6/2001 | Wang | 712/300 |
| 6,279,126 B1 | * 8/2001 | Malik et al. | 714/38 |
| 6,351,750 B1 | * 2/2002 | Duga et al. | 707/102 |
| 6,480,913 B1 | * 11/2002 | Monteiro | 710/65 |
| 6,594,708 B1 | * 7/2003 | Slaughter et al. | 719/315 |

* cited by examiner

*Primary Examiner*—Thomas Lee
*Assistant Examiner*—Mark Connolly

(57) ABSTRACT

A circuit for reconfiguring data into the particular data format for processors and system memory when operating in a particular dual-data format processing environment. The circuit uses an interface having read and write multiplexers to swap data bytes automatically, transforming data between big and little endian formats, based upon a control signal.

20 Claims, 6 Drawing Sheets

CIRCUIT FOR ALLOWING DATA RETURN IN DUAL-DATA FORMATS

FIELD OF THE INVENTION

The present invention relates to a circuit which allows processors to read or write data in dual-data formats.

BACKGROUND OF THE INVENTION

Two types of byte ordering for processing data include the big endian byte ordering and the little endian byte ordering, as shown in FIG. 1. In big endian format 100, the order of bytes in a word is such that the most significant byte or digits are placed left-most in the word structure, the way humans deal with normal arithmetic. In comparison, little endian format 110 places the least significant byte or digits leftmost in the word structure. With the little endian format, the word structure is set-up for the required processing order, since numbers are calculated by a processor starting with the least significant (left-most) digits.

Because of the existence of the two endian byte ordering formats, there are two possible endian situations when running programs in a mixed endian processing environment. The first possibility is where the internal endian format of the processor matches that of the software data. In this case, no conversion of the data is required, since the data bytes can be read directly by the processor. The second possibility is where the internal endian format of the processor does not match that of the software data. In this latter case, a series of shifts and swaps are required to transform the data into the endian format to match that of the processor, because processors only read data in their own endian format. In particular, the processor must store the data in a temporary storage and perform a series of shifts and swaps under software control to reconfigure the data to the particular endian format used by it. This software manipulation consumes valuable memory space and time.

Accordingly, a need exists to facilitate conversion of data between particular endian formats.

SUMMARY OF THE INVENTION

A method consistent with the present invention reconfigures data for communication between processors and a memory. The method includes receiving a plurality of bytes in a particular dual-data format, and receiving a control signal set to a first state if the processors and the memory are in the same dual-data format and set to a second state if the processors and the memory are in a different dual-data format. The method also includes selectively reconfiguring the bytes based upon the control signal, including transmitting the data in the particular dual-data format if the control signal is set to the first state and reconfiguring the particular dual-data format of the bytes if the control signal is set to the second state.

A first interface consistent with the present invention transmits and selectively reconfigures data between processors and a memory. The interface includes a data bus for receiving a plurality of bytes in a particular dual-data format, and a control terminal for receiving a control signal which is set to a first state if the processors and the memory are in the same dual-data format and set to a second state if the processors and the memory are in a different dual-data format. The interface also includes control logic, coupled to the data bus and the control terminal, that transmits the data in the particular dual-data format if the control signal is set to the first state and reconfigures the particular dual-data format of the bytes if the control signal is set to the second state.

A second interface consistent with the present invention transmits and selectively reconfigures data between processors and a memory. The interface includes a first data bus for receiving bytes, a second data bus for outputting bytes, and a control terminal for receiving a control signal based upon a particular dual-data format of the received bytes. The interface also includes a logic circuit coupled to the first data bus, the second data bus, and the control terminal. The logic circuit receives the bytes from the first data bus, selectively reconfigures the particular dual-data format of the received bytes based upon the control signal, and outputs the selectively reconfigured bytes on the second bus.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Figure 1:
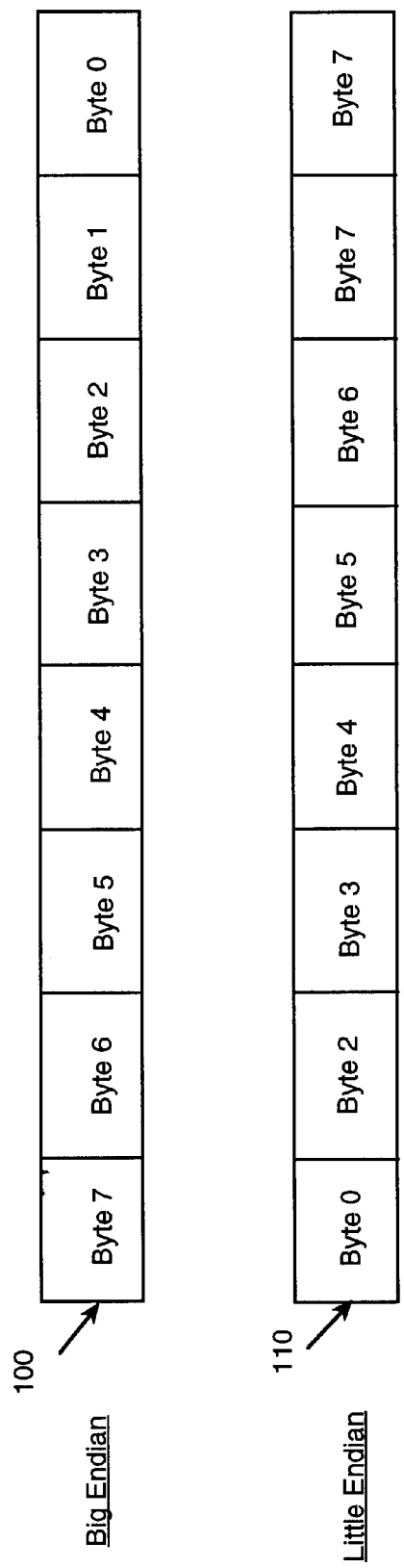
FIG. 1 illustrates how bytes are arranged in the big-endian format and the little endian format.
Figure 2:
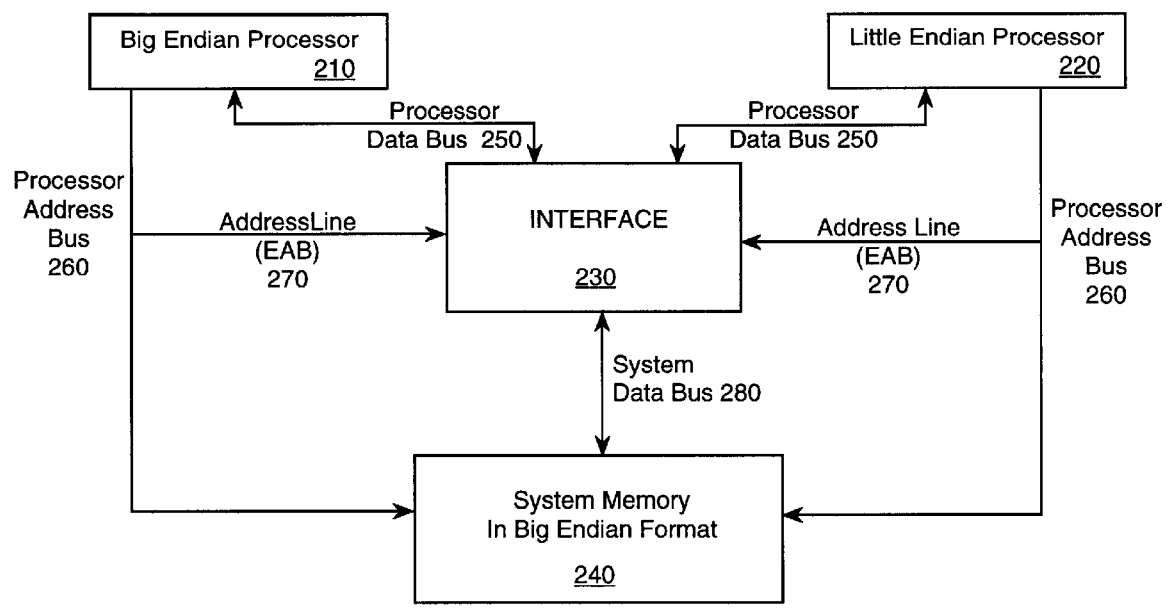
FIG. 2 is a block diagram illustrating an interface for transferring and selectively converting an endian format of data between processors and system memory.

Referring to FIG. 2, a circuit in accordance with the principles of the present invention uses an interface 230 to transfer data between a system memory 240 and dual-data format processors. In this example, the dual-data format processors include a big endian processor 210 and a little endian processor 220. Big endian processor 210 is a processor that performs arithmetic operations in big endian format 100, while little endian processor 220 is a processor that performs arithmetic operations in little endian format 110. Interface 230 selectively reconfigures and transfers data bytes when operating in this dual endian processing environment, returning data in the particular endian format for processors 210 and 220, and system memory 240.

Processors 210 and 220 are coupled to interface 230 by processor data buses 250. System memory 240 is coupled to interface 230 by a system data bus 280. Processors 210 and 220 and system memory 240 are also coupled to processor address buses 260. An Endian Alias Bit (EAB) 270, which is the most significant address bit in the address bus line in this example, connects to interface 230 to control the data byte reconfiguration. EAB 270 acts as a control signal. It could also be implemented using any bit in the address bus or another type of signal.

Processor data buses 250 and system data bus 280 are 64 bits wide in this example, organized in 8 bytes, of 8 bits each.

Data buses of different widths and bytes may alternatively be used. Processors 210 and 220 read data from system memory 240 and write data to system memory 240 through interface 230. Data are stored in system memory 240 in the big endian format in this example.

Figure 3:
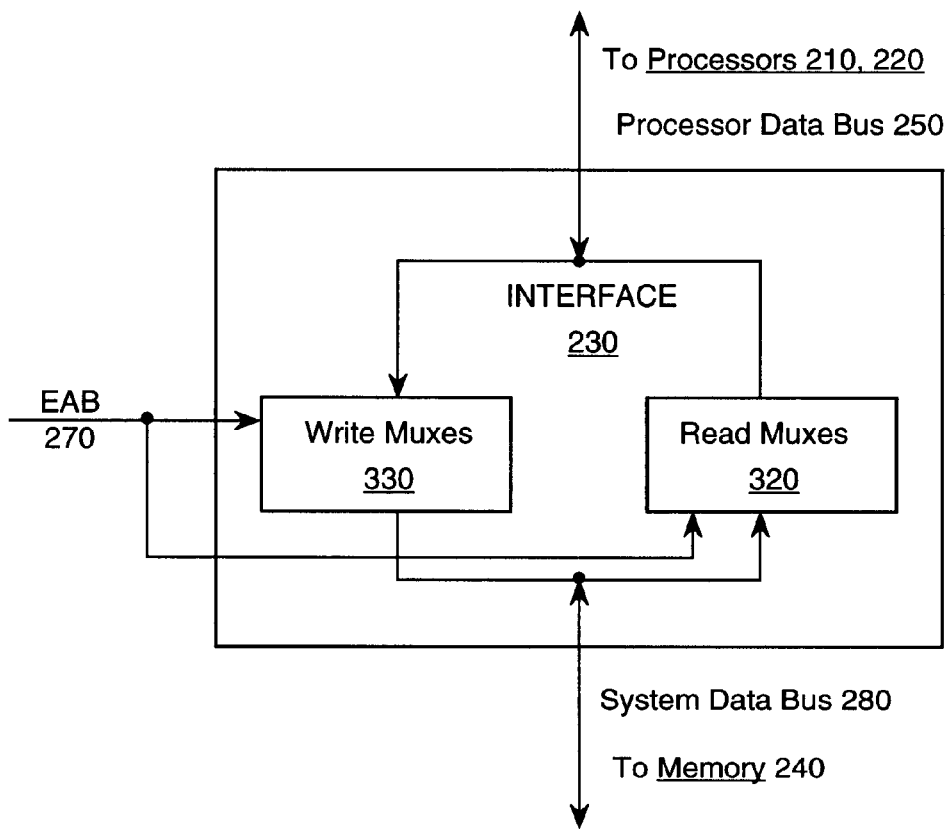
FIG. 3 is a block diagram illustrating how the interface uses read and write multiplexers to transfer and selectively convert the data.

As shown in more detail in FIG. 3, interface 230 selectively reconfigures data using multiplexers. The term "multiplexers" includes any logic that chooses between two inputs with select line. The control logic could alternatively use any logic circuitry for reconfiguring the data. In this example, the control logic is implemented by read multiplexers 320 and write multiplexers 330. The EAB 270 in the address line connects to a control terminal for providing the control signal to read multiplexers 320 and write multiplexers 330.

Specifically, as processors 210 and 220 read data from system memory 240, the data passes from memory 240 along system data bus 280 to read multiplexers 320 in interface 230. Read multiplexers 320 selectively reconfigure an endian format of the data depending on whether the EAB 270 is set. Interface 230 then returns the data to processors 210 or 220 on processor data bus 250.

Conversely, as processors 210 and 220 write data to system memory 240, the data passes from processors 210 and 220 along processor data bus 250 to write multiplexers 330 in interface 230. Write multiplexers 330 also selectively reconfigure an endian format of the data depending on whether EAB 270 is set. Interface 230 then writes the data to system memory 240 on system data bus 280.

Processors 210 and 220 provide the addresses of the data to be read from or written to system memory 240 on processor address buses 260. Processors 210 and 220 also selectively set EAB 270 under software control. EAB 270 is zero for big endian format 100 and set to one for little endian format 110; alternatively, it could have different values for specifying a particular endian format.

Figure 4:
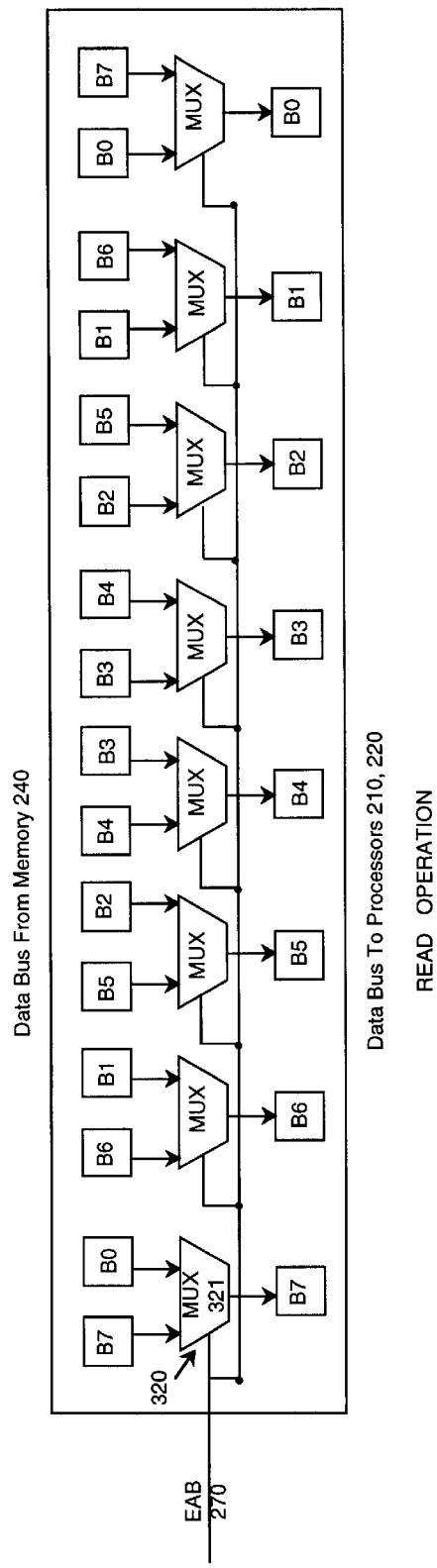
FIG. 4 is a block diagram of the read multiplexers in the interface.

FIG. 4 illustrates logic circuitry for implementing read multiplexers 320. Data are typically stored in system memory 240 in big endian format 100. When little endian processor 220 reads data from the system memory 240 at a certain address, its most significant address bit (EAB) 270 is set to a value "1". Conversely, when a big endian processor 210 reads data at a certain address, EAB 270 has a value "0".

Read multiplexers 320 include eight multiplexers in this example, one for each byte of data buses 250 and 280. The data bus 280 is partitioned among the multiplexers as shown such that each multiplexer receives as inputs from system memory 240 two bytes. For example, multiplexer 321 receives as inputs byte 7, the most significant byte of the data word, and byte 0, the least significant byte of the data word. Multiplexer 321 also receives as a control input EAB 270 from processors 210 and 220. Multiplexer 321 outputs either byte 7 or byte 0, depending upon the state of EAB 270. It either passes the data unchanged by transmitting byte 7, or reconfigures the data by selecting byte 0. The other multiplexers 320 operate in a similar manner for the bytes they receive, as shown in FIG. 4.

Figure 5:
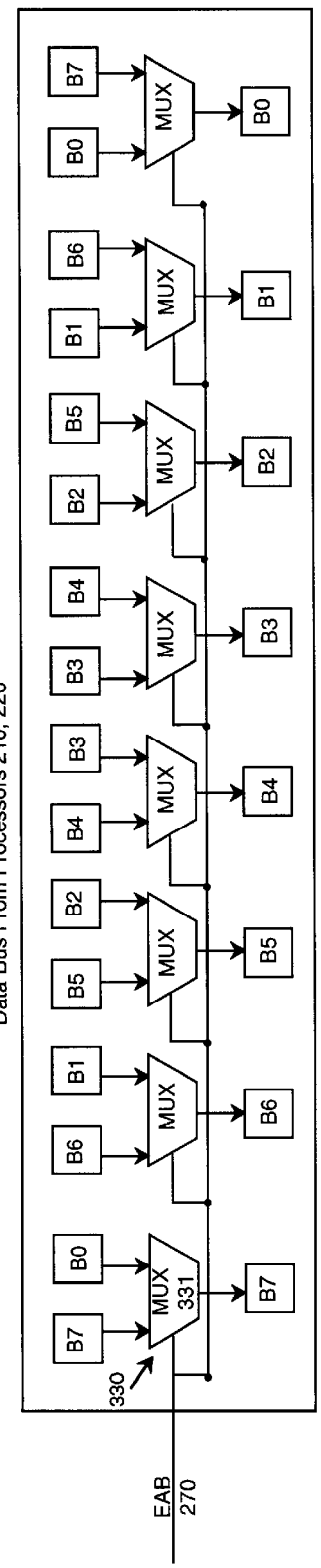
FIG. 5 is a block diagram of the write multiplexers in the interface.

Similarly, FIG. 5 illustrates logic circuitry for implementing write multiplexers 330. When little endian processor 220 writes data to system memory 240 at certain address, its most significant address bit (EAB) 270 is set to a value "1". Conversely, when big endian processor 210 writes data at the same address, EAB 270 has a value "0".

Write multiplexers 330 also include eight multiplexers in this example, one for each byte of data buses 250 and 280. The data bus 250 is partitioned among the multiplexers such that each multiplexer receives as inputs from processors 210 and 220 two bytes. For example, multiplexer 331 receives as inputs byte 7 and byte 0. Multiplexer 331 also receives as a control input EAB 270 from processors 210 and 220. Multiplexer 331 outputs either byte 7 or byte 0, depending upon the state of EAB 270. It either passes the data unchanged by transmitting byte 7, or reconfigures the data by selecting byte 0. The other multiplexers 330 operate in a similar manner for the bytes they receive, as shown in FIG. 5.

Figure 6:
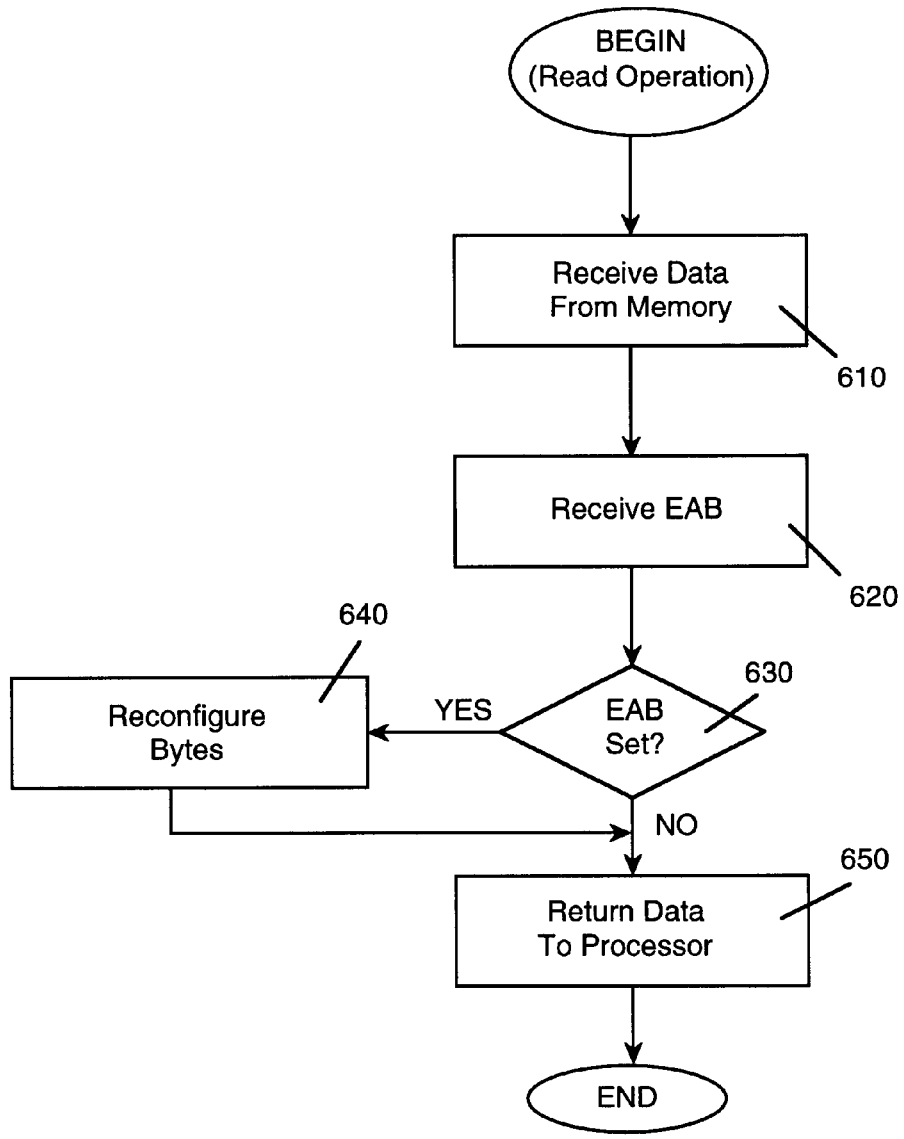
FIG. 6 is a chart of the operation of the read multiplexers.

FIG. 6 is a flow chart of the read operation implemented by read multiplexers 320. Interface 230 receives data from system memory 240 (step 610). Interface 230 also receives as a control input EAB 270 from processor address bus 260 (step 620). Interface 230 then detects EAB 270 using read multiplexers 320 (step 630). If EAB 270 is set to a value "1", interface 230 reconfigures the data by swapping the bytes as described with respect to FIG. 4 (step 640). If EAB 270 has a value "0", interface 230 passes the data without change. In the final step, interface 230 returns the data to processors 210 and 220 (step 650).

Figure 7:
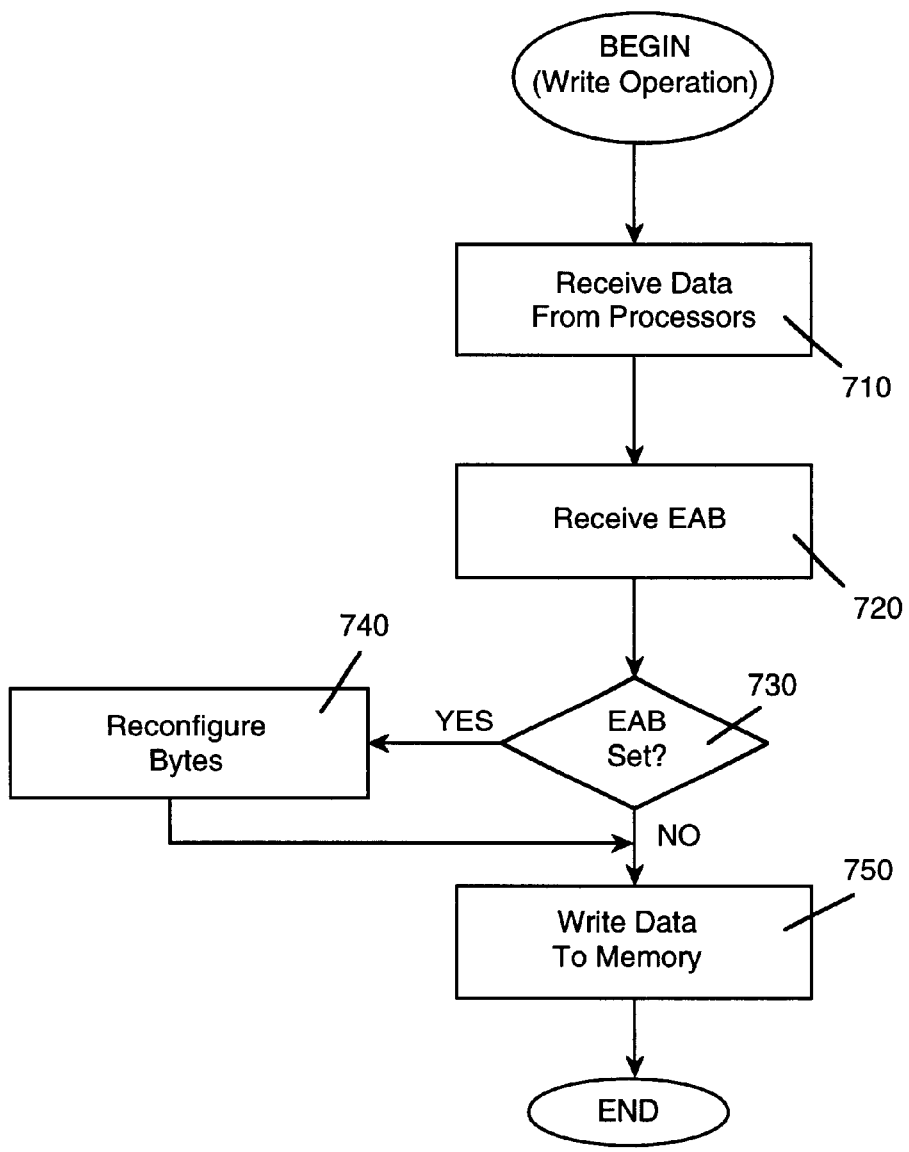
FIG. 7 is a flow chart of the operation of the write multiplexers.

FIG. 7 is a flow chart of the write operation implemented by write multiplexers 330. Interface 230 receives data from processors 210 and 220 (step 710). At the same time, the interface 230 receives as a control input EAB 270 from processor address bus 260 (step 720). Interface 230 then detects EAB 270 using the write multiplexers 330 (step 730). If EAB 270 is set to a value "1", interface 230 reconfigures the data by swapping the bytes as described with respect to FIG. 5 (step 740). If EAB 270 has a value "0", interface 230 passes the data without change. In the final step, interface 230 writes the data to system memory 240 (step 750).

In summary, interface 230 either returns the data unchanged when it detects EAB 270 has a value "0" or automatically swaps the bytes when EAB 270 is set to a value "1" to reconfigure the endian format of the data. As a result, processors 210 and 220 and system memory 240 receive data in their particular endian or other dual-data format. Accordingly, reconfiguration of dual endian-ness is accomplished in hardware rather than time consuming software manipulation. Multiplexers or other logic as shown can also be used for other dual-data format reconfiguration depending, for example, on how the data bytes are partitioned among the multiplexers.

The terms and descriptions used here are set forth by way of illustration only and are not meant as limitation. Those skilled in the art will recognize that numerous variations are possible within the scope of the invention as defined in the following claims and their equivalents.

What is claimed is:

1. A method of reconfiguring data for communication between processors and a memory, comprising:

receiving a plurality of bytes in a particular dual-data format associated with a first processor or a second processor, the first processor and the memory are in the same dual-data format and the second processor and the memory are in a different dual-data format;

receiving a control signal via one bit of a multi-bit address bus set to a first state for the first processor or set to a second state for the second processor; and selectively reconfiguring the bytes based upon the control signal, including transmitting the data in the particular dual-data format if the control signal is set to the first state and reconfiguring the particular dual-data format of the bytes if the control signal is set to the second state.

2. The method of claim 1 wherein said receiving said plurality of bytes comprises receiving the bytes in a particular endian format from the first processor or the second processor in a write operation.

3. The method of claim 1 wherein said receiving said plurality of bytes comprises receiving the bytes in a particular endian format from the memory in a read operation.

4. The method of claim 1 wherein the control signal is the most significant bit in the multi-bit address bus.

5. The method of claim 1 wherein said selectively reconfiguring comprises transmitting the bytes through a control logic that chooses between two inputs with select line.

6. The method of claim 5 wherein said selectively reconfiguring comprises transmitting the bytes through a plurality of multiplexers controlled by the control logic.

7. The method of claim 6 wherein said selectively reconfiguring further comprises transmitting the bytes through a plurality of read multiplexers in a read operation.

8. The method of claim 6 wherein said selectively reconfiguring further comprises transmitting the bytes through a plurality of write multiplexers in a write operation.

9. An interface for transmitting and selectively reconfiguring data between processors and a memory, comprising:

a data bus for receiving a plurality of bytes in a particular dual-data format associated with a first processor or a second processor, the first processor and the memory are in the same dual-data format and the second processor and the memory are in a different dual-data format;

a control terminal for receiving a control signal as one bit of a multi-bit address bus which is set to a first state for the first processor or set to a second state for the second processor; and control logic, coupled to the data bus and the control terminal, that transmits the data in the particular dual-data format if the control signal is set to the first state and reconfiguring the particular dual-data format of the bytes if the control signal is set to the second state.

10. The interface of claim 9 wherein the control logic comprises a plurality of read multiplexers receiving bytes in a particular endian format from the memory.

11. The interface of claim 9 wherein the control logic comprises a plurality of write multiplexers receiving bytes in a particular endian format from the first processor or the second processor.

12. The interface of claim 9 wherein the control signal is the most significant bit in the multi-bit address bus.

13. The interface of claim 9 wherein the data bus includes a bus for receiving the bytes in a particular endian format from the memory.

14. The interface of claim 9 wherein the data bus includes a bus for receiving the bytes in a particular endian format from one of the first and second processors.

15. The interface of claim 10 wherein each of the read multiplexers includes a first input for receiving a byte in a first endian format, a second input for receiving a byte in a second endian format, and a control input for receiving the control signal.

16. The interface of claim 11 wherein each of the write multiplexers includes a first input for receiving a byte in a first endian format, a second input for receiving a byte in a second endian format, and a control input for receiving the control signal.

17. An interface for transmitting and selectively reconfiguring data between processors and a memory, comprising:

a first data bus for receiving bytes in a particular dual-data format associated with a first processor or a second processor, the first processor and the memory are in the same dual-data format and the second processor and the memory are in a different dual-data format;

a second data bus for outputting bytes;

a control terminal coupled to one bit of a multi-bit address bus for receiving a control signal set to a first state for the first processor or set to a second state for the second processor; and a logic circuit, coupled to the first data bus, the second data bus, and the control terminal, wherein the logic circuit receives the bytes from the first data bus, selectively reconfigures the particular dual-data format of the received bytes based upon the control signal, and outputs the selectively reconfigured bytes on the second bus.

18. The interface of claim 17 wherein the logic circuit includes a plurality of read multiplexers for selectively reconfiguring the received bytes for a read operation.

19. The interface of claim 17 wherein the logic circuit includes a plurality of write multiplexers for selectively reconfiguring the received bytes for a write operation.

20. The interface of claim 17 wherein the control signal is the most significant bit in the multi-bit address bus.

* * * * *